United States Patent Office 2,865,889
Patented Dec. 23, 1958

2,865,889
REDUCED COPOLYMERS

Joseph A. Blanchette, East Longmeadow, Mass., assignor to Monsanto Chemical Company, St. Louis, Mo., a corporation of Delaware No Drawing. Application June 21, 1957
Serial No. 667,290

7 Claims. (Cl. 260—63)

This invention relates to new copolymers of unsaturated nitriles and unsaturated ketones. More particularly it relates to reduced copolymers of vinyl nitriles and vinyl, or isopropenyl, ketones.

Vinyl polymers containing both carbonyl and nitrile groups within the same molecule are relatively new in the art. Early laboratory attempts to form such materials invariably resulted in mechanical mixtures of polyvinyl nitriles and polyvinyl ketones. However, U. S. Patent 2,451,435, issued in 1948, describes a process for preparing true copolymers of vinyl nitriles and vinyl ketones. These copolymers were found to have many desirable properties but the unavailability, until recently, of large quantities of vinyl ketones deterred the commercial development of these resins.

One object of this invention is to provide new resins derived from vinyl nitrile and vinyl ketone copolymers.

Another object is to provide reduced copolymers of vinyl nitriles and vinyl ketones.

Another object is to provide processes for preparing such copolymers.

These and other objects are attained by the catalytic, or chemical, reduction of copolymers of acrylonitrile, or methacrylonitrile, and ketones wherein the carbon of the carbonyl radical is directly joined to (1) a vinyl or an isopropenyl radical and (2) a phenyl or an alkyl radical containing 1–5 carbon atoms.

The following examples are given to illustrate the invention and are not intended as limitations thereof. Where parts are mentioned, they are parts by weight.

EXAMPLE I

Twelve parts of an acrylonitrile-methyl vinyl ketone copolymer containing about 40% by weight of acrylonitrile are dissolved in 150 ml. of tetrahydrofuran. This solution, plus about 0.6 parts of Raney nickel catalyst are charged into a high pressure reactor equipped with a means for effecting turbulent agitation. The copolymer is catalytically hydrogenated, under a 40 p. s. i. hydrogen pressure and at a temperature of 75° C., in 8–10 hours. When the reaction is completed, the Raney nickel catalyst is filtered from the solution and the filtrate is added to about 750 ml. of water to precipitate the reduced copolymer, which is recovered by a second filtration. Infra-red analysis shows that substantially all of the carbonyl groups have been reduced to secondary hydroxyl groups while substantially none of the nitrile groups have been reduced.

EXAMPLE II

Fourteen parts of an acrylonitrile-methyl isopropenyl ketone copolymer containing about 40% by weight of acrylonitrile are dissolved in 150 ml. of tetrahydrofuran. This solution plus 1.4 parts of a 5% palladium on carbon catalyst are charged into a high pressure reactor equipped with a means for effecting turbulent agitation. The copolymer is catalytically hydrogenated, under a 1200 p. s. i. hydrogen pressure and at a temperature of 175° C., in 8–10 hours. When the reaction is completed, the palladium on carbon catalyst is filtered from the solution and the filtrate is added to about 750 ml. of water to precipitate the reduced copolymer, which is recovered by a second filtration. Infra-red analysis shows substantially complete reduction of both the carbonyl and nitrile groups to secondary hydroxyl and primary amino groups respectively.

EXAMPLE III

Five parts of an acrylonitrile-methyl vinyl ketone copolymer containing 20% by weight of acrylonitrile are dissolved in 50 ml. of tetrahydrofuran. This solution is slowly added, with agitation, to a reaction vessel containing a suspension of 5 parts of lithium aluminum hydride in 50 ml. of tetrahydrofuran, under such conditions that the reaction mixture begins to reflux gently due to the exothermic nature of the reaction. When all of the copolymer solution has been added, the reaction mixture is refluxed for an additional 1–2 hours to complete the chemical reduction of the copolymer. Excess lithium aluminum hydride is decomposed and solubilized by the cautious addition of a few ml. of ethanol. The solution is poured onto ice containing about 10 ml. of hydrochloric acid to precipitate the reduced copolymer, which is then removed by filtration. The copolymer is further purified by dissolving it in methyl ethyl ketone and adding the solution to water to reprecipitate the copolymer. Infra-red analysis shows that substantially all of the carbonyl groups have been reduced to secondary hydroxyl groups while substantially none of the nitrile groups have been reduced.

The copolymers which are reduced to form the resins of this invention are copolymers of acrylonitrile or methacrylonitrile with ketonic monomers corresponding to the general formula:

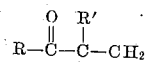

wherein R may be a phenyl radical or an alkyl radical containing 1–5 carbon atoms and R' may be hydrogen or a methyl radical. Examples of such copolymers are acrylonitrile-methyl vinyl ketone, acrylonitrile-phenyl vinyl ketone, acrylonitrile-methyl isopropenyl ketone, etc. Copolymers containing 10–50% by weight of the nitrile compound form a preferred embodiment of this invention.

Reduction of the aforementioned copolymers may be effected by either chemical or catalytic means. Chemical reduction reaches only the carbonyl groups of the copolymer, reducing them to secondary hydroxyl groups, and leaves the nitrile groups thereof substantially intact. Conventional chemical reducing agents, e. g., lithium aluminum hydride, sodium borohydride, etc., may be employed. Catalytic reduction embraces two processes: (1) a low pressure process wherein only the carbonyl groups of the copolymer are reduced, to secondary hydroxyl groups, and the nitrile groups thereof are substantially unattached, and (2) a high pressure process wherein both the carbonyl and the nitrile groups of the copolymer are substantially completely reduced to secondary hydroxyl and primary amino groups respectively. Conventional reduction catalysts, e. g., palladium or platinum on charcoal, platinum oxide, Raney nickel, etc., may be used for either process; however, Raney nickel is preferred. Copper chromite may also be used, but only for the low pressure process.

Solid phase reduction of these copolymers results in heterogeneous resins wherein essentially only the surface groups have been reduced. Therefore, in the practice of this invention, reduction is accomplished with the copolymer dissolved in an organic solvent. The solvent resistance of these copolymers limits the choice of solvents, but most organic liquids in which they are soluble may be used, provided the solvent is inert to the reduction reaction. Tetrahydrofuran and dimethylformamide have been found to be suitable solvents.

In one embodiment of this invention, both the carbonyl and the nitrile groups of the copolymer are catalytically reduced to secondary hydroxyl and primary amino groups respectively. It has been found that hydrogenation must be effected at elevated hydrogen pressures, i. e., at least 1200 p. s. i., to achieve complete reduction within a reasonable length of time. One of the aforementioned catalysts, except copper chromite, may be used in concentrations of 3–10% by weight, based upon the copolymer; however, it is preferred to use Raney nickel in 5–10% concentration. The copolymer solution and catalyst are charged to a high pressure hydrogenation apparatus equipped with means for producing turbulent agitation of the reaction mixture, e. g., rocker arm, etc. The contents are heated, with turbulent agitation, under at least a 1200 p. s. i. hydrogen atmosphere to a temperature of 100° C.–450° C. and maintained there for about 5–10 hours to complete the reduction of the carbonyl and nitrile groups. The catalyst is removed, e. g., by filtration, and the reduced copolymer is precipitated by adding the solution to a large excess of a non-solvent, e. g., water, methanol, ethanol, etc. The reduced copolymers prepared by this embodiment contain reactive hydroxyl and amino groups. If desired the reduction reaction may be terminated short of completion to yield partially reduced copolymers wherein substantially all of the carbonyl groups have been reduced to hydroxyl but only a portion of the nitrile groups have been reduced to amino groups.

In a variation of the above embodiment, copolymers may be catalytically reduced under less vigorous conditions so that substantially only the carbonyl groups are reduced. Hydrogen pressures of about 20–50 p. s. i. and temperatures of 20° C.–100° C. are used in a process similar to the main embodiment, above, in all other respects. However, catalyst concentrations may range from as low as 0.5% up to 10% by weight, based upon the copolymer. Again, Raney nickel is the preferred catalyst and may be used in 2–10% concentrations. The reduced copolymers prepared by this variation contain reactive hydroxyl and nitrile groups. Again, if desired, the reduction may be terminated short of completion to yield a product wherein only a portion of the carbonyl groups have been reduced to hydroxyl groups.

In the second embodiment of this invention, substantially only the carbonyl groups of the copolymer are reduced by means of a chemical reduction process. This embodiment actually provides an alternative method for preparing the reduced copolymers of the above low pressure variation of the catalytic process. One molar portion of copolymer in organic solution is reacted in a stirred reactor, with 1–3 molar portions of reducing agent, e. g., lithium aluminum hydride, sodium borohydride, etc. The reaction temperature is maintained at from 50° C. to the reflux temperature of the reaction mixture for about 1–5 hours to complete the reduction of the carbonyl groups. When the reduction is complete the excess reducing agent plus the copolymer-reducing agent complex formed are decomposed by adding a hydrolyzing agent, e. g., water, ethanol, ethyl acetate, etc. The solution is acidified and cooled to precipitate the reduced copolymer, which is recovered by filtration. The reduced copolymer may be purified, for example, by dissolving the precipitate in a solvent, e. g., methyl ethyl ketone, tetrahydrofuran, etc., and subsequently re-precipitating the reduced copolymer by adding this solution to a large excess of a non-solvent, e. g., water, methanol, ethanol, etc. The reduced copolymers prepared by this embodiment contain reactive hydroxyl and nitrile groups. Here again, partially reduced copolymers may be obtained by terminating the reduction reaction short of completion.

The products of this invention possess many valuable properties and have several uses depending upon the ratio of vinyl nitrile to vinyl ketone in the initial copolymer. In general, resins derived from copolymers containing minimum vinyl nitrile, i. e., 10% by weight, are the softest and have the highest flexibility. As the vinyl nitrile content of the copolymer is increased the resins become harder and more rigid, becoming quite hard and tough at about 50% vinyl nitrile by weight. As a group these resins are quite resistant to solvents, have good clarity, and exhibit a marked affinity for polar substances. As a result, these resins have been found to be useful as adhesives, molding compositions surface films, and as ion exchange resins. The presence of reactive hydroxyl and amino groups makes these products attractive as precursors for other chemically modified copolymers.

Compositions containing the copolymers of this invention may be modified by the incorporation of conventional additives such as dyestuffs, fillers, extenders, stabilizers, lubricants, etc. They may be used alone or in combination with other polymeric materials, e. g., with other vinyl, vinylidene, etc. polymers.

It is obvious that many variations may be made in the products and processes set forth above without departing from the spirit and scope of this invention.

What is claimed is:

1. A reduced copolymer of 10–50% by weight of a nitrile selected from the group consisting of acrylonitrile and methacrylonitrile and 90–50% by weight of a ketone wherein the carbon of the carbonyl radical is directly joined to a radical selected from the group consisting of vinyl and isopropenyl radicals and to a radical selected from the group consisting of phenyl and alkyl radicals containing 1–5 carbon atoms; the nitrile groups of said copolymer being at least partially reduced to primary amino groups and the carbonyl groups thereof being substantially completely reduced to secondary hydroxyl groups.

2. A reduced copolymer as in claim 1 wherein the nitrile is acrylonitrile and the ketone is methyl vinyl ketone.

3. A reduced copolymer as in claim 1 wherein both the nitrile groups and the carbonyl groups thereof are substantially completely reduced to primary amino groups and secondary hydroxyl groups respectively.

4. A process for preparing reduced copolymers wherein a copolymer of 10–50% by weight of a nitrile selected from the group consisting of acrylonitrile and methacrylonitrile and 90–50% by weight of a ketone wherein the carbon of the carbonyl radical is directly joined to a radical selected from the group consisting of vinyl and isopropenyl radicals and to a radical selected from the group consisting of phenyl and alkyl radicals containing 1–5 carbon atoms is catalytically hydrogenated in the presence of a hydrogenation catalyst selected from the group consisting of palladium, platinum and Raney nickel at a temperature of 100–450° C. and a hydrogen pressure of at least 1200 p. s. i. until at least a portion of the nitrile groups of said copolymer have been reduced to primary amino groups and substantially all of the carbonyl groups of said copolymer have been reduced to secondary hydroxyl groups.

5. A reduced copolymer of 10–50% by weight of a nitrile selected from the group consisting of acrylonitrile and methacrylonitrile and 90–50% by weight of a ketone wherein the carbon of the carbonyl radical is directly joined to a radical selected from the group consisting of vinyl and isopropenyl radicals and to a radical selected from the group consisting of phenyl and alkyl radicals containing 1–5 carbon atoms; the carbonyl groups of said copolymer being substantially completely reduced to secondary hydroxyl groups and the nitrile groups thereof remaining substantially unreacted.

6. A reduced copolymer as in claim 5 wherein the nitrile is acrylonitrile and the ketone is methyl vinyl ketone.

7. A process for preparing reduced copolymers wherein a copolymer of 10–50% by weight of a nitrile selected from the group consisting of acrylonitrile and methacrylonitrile and 90–50° by weight of a ketone wherein the carbon of the carbonyl radical is directly joined to a radical selected from the group consisting of vinyl and isopropenyl radicals and to a radical selected from the group consisting of phenyl and alkyl radicals containing 1–5 carbon atoms is hydrogenated in the presence of a hydrogenation catalyst selected from the group consisting of copper chromite, palladium, platinum and Raney nickel at a temperature of 20–100° C. and at a hydrogen pressure of 20–50 p. s. i. until substantially all of the carbonyl groups of said copolymer have been reduced to secondary hydroxyl groups.

References Cited in the file of this patent

UNITED STATES PATENTS

| | | |
|---|---|---|
| 2,451,435 | Elwell et al. | Oct. 12, 1948 |
| 2,585,583 | Pinkney | Feb. 12, 1952 |
| 2,673,886 | Steadman | Mar. 30, 1954 |

OTHER REFERENCES

Adams et al.: "Organic Reactions" (1951), vol. VI, page 474, published by John Wiley & Sons, Inc., New York. (Copy in Division 31.)